United States Patent Office 3,076,758
Patented Feb. 5, 1963

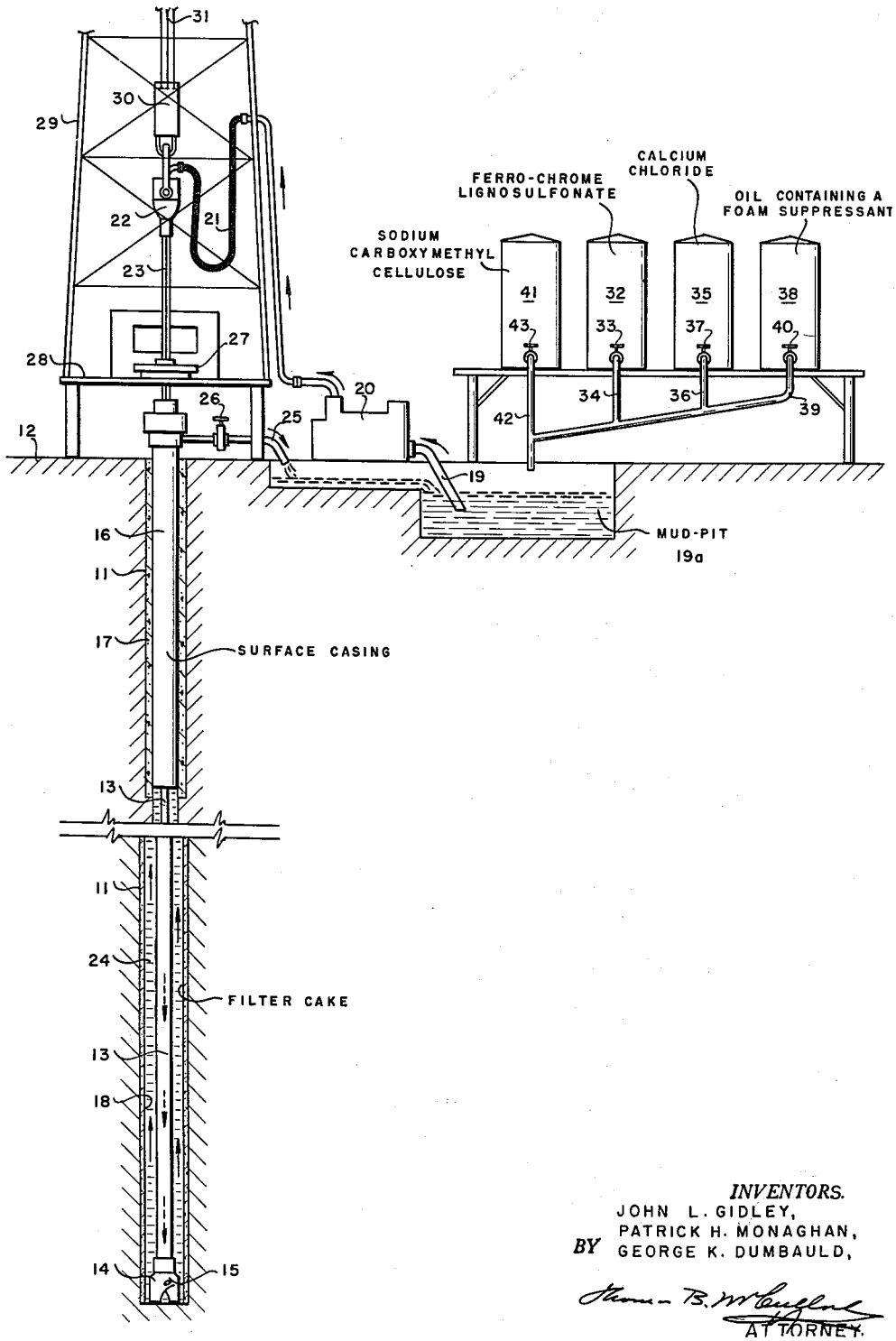

3,076,758
DRILLING FLUID AND DRILLING THEREWITH
John L. Gidley, Houston, and Patrick H. Monaghan and George K. Dumbauld, Bellaire, Tex., assignors, by mesne assignments, to Jersey Production Research Company, Tulsa, Okla., a corporation of Delaware
Filed July 2, 1959, Ser. No. 824,627
17 Claims. (Cl. 252—8.5)

The present invention is directed to a drilling fluid. More particularly, the invention is concerned with a drilling fluid which has improved properties. In its more specific aspects, the invention is directed to a composition for use in and a method of drilling a well and controlling fluid loss in the drilling of wells.

The present invention may be briefly described as a composition suitable for use in a well wherein a suspension of clay and an aqueous solution containing a water-soluble salt of an alkaline earth metal is formed with the alkaline earth metal being present in a sufficient amount to provide in the composition alkaline earth metal ion of at least 1800 p.p.m., the composition containing ferrochrome-lignosulfonate and alkali metal salt of carboxymethyl cellulose in sufficient amount to maintain in the composition an A.P.I. filtration rate of less than about 20 ml., the ferrochrome-lignosulfonate and alkali metal salt of carboxymethyl cellulose being in a ratio of about 1.8:1 to about 2.7:1 after break-over and the composition having a pH within the range from about 7.5 to about 10 and a density from about 8 to about 18 pounds per gallon.

The present invention also contemplates a method for controlling fluid loss in the drilling of a well in which the drilling fluid contains a water-soluble salt of an alkaline earth metal in an amount sufficient to provide in the drilling fluid an amount of alkaline earth metal ion of at least 1800 p.p.m. There is maintained in the drilling fluid ferrochrome-lignosulfonate and alkali metal salt of carboxymethyl cellulose in amounts sufficient to maintain the A.P.I. filtration rate of the drilling fluid less than about 20 ml. and to maintain in the drilling fluid a ratio of ferrochrome-lignosulfonate to alkali metal salt of carboxymethyl cellulose in the range from about 1.8 and about 2.7 after break-over.

In the practice of this invention it is necessary to treat the hydrated clay suspension first with about 1 to about 3 pounds of ferrochrome-lignosulfonate and then followed by addition, either separately or simultaneously, of ferrochrome-lignosulfonate (Q-Broxin) and alkaline earth salt to give a concentration of about 5 to about 20 pounds Q-Broxin and 1800 to 40,000 p.p.m. of the alkaline earth ion. This treatment establishes the flow properties of the drilling fluid and then the exact control of filtration rate is maintained by the critical addition of ferrochrome-lignosulfonate (Q-Broxin) and the carboxymethyl cellulose in the stated ratio.

The ratio in the range between 1.8 and about 2.7 is critical and may be maintained by separately adding ferrochrome-lignosulfonate or alkali metal salt of carboxymethyl cellulose to the drilling fluid. However, it is also contemplated that the ratio may be maintained by adding both the ferrochrome-lignosulfonate and the alkali metal salt of carboxymethyl cellulose to the drilling fluid.

The water-soluble salt of an alkaline earth metal may be a calcium, magnesium, barium, or strontium salt, which is water soluble. Preferably, the water-soluble salt is a calcium salt. Illustrative of the water-soluble salts are the chlorides, nitrates, acetates, formates, water-soluble organic salts, and the like. Other of the alkaline earth metal salts which are not applicable in the practice of the present invention are the sulfates, carbonates, and phosphates. Likewise, the hydroxides may not be used in the practice of the present invention.

The amount of the water-soluble alkaline earth metal salt employed in the present composition is sufficient to provide in the composition an alkaline earth metal ion in an amount of at least 1800 p.p.m. with a suitable upper limit of about 40,000 p.p.m. Above a concentration of about 40,000 p.p.m. the desired fluid properties show deterioration while below about 1800 p.p.m. the fluid does not possess the desired characteristics. Actually, for the alkaline earth metals such as calcium, barium, and strontium, a sufficient amount should be employed to provide alkaline earth metal ion of at least 2000 p.p.m., which is preferred.

The alkali metal salt of carboxymethyl cellulose is preferably sodium carboxymethyl cellulose, but other alkali metal salts may be used such as potassium and lithium salts. The amount of the alkali metal salt of carboxymethyl cellulose employed in the practice of the present invention may range from about 0.1 to about 10 pounds per barrel.

The clay employed in the present invention is suitably used in an amount of about 7 to about 70 pounds per barrel of the drilling fluid. The clay used is preferably a bentonitic clay, but any suitable clay may be used such as illites, montmorillonites, zeolites, attupulgites, natural clays, and other clays which function in a similar manner.

The clays are suitably suspended in water together with the other materials to form a drilling fluid having a density of about 8 to about 18 pounds per gallon. To achieve a fluid having a high density, it may be necessary to employ weighting agents such as those available to the market as illustrated by barites (barium sulfate), barium carbonate, ferric oxide, lead oxide, galena, and other inorganic and/or organic compounds, and the like, having a suitable density and which do not adversely affect the properties of the mud. While it is contemplated that an aqueous suspension of clay will form the base drilling mud of the present invention, it is contemplated that an oil-emulsion drilling fluid may be employed where both oil and water are present.

The pH of the improved fluid must be carefully controlled and is in the range from about 7.5 to about 10, with a preferred pH in the range from about 8 to about 9. Desirable results are obtained at a pH of about 8.5.

An essential ingredient of the fluid of the present invention is ferrochrome-lignosulfonate, which is manufactured by and available from the Puget Sound Pulp and Timber Company at Bellingham, Washington. This ferrochrome-lignosulfonate is marketed under the trade name of Q-Broxin. The Q-Broxin is employed in the present invention in an amount from about 5 to about 20 pounds per barrel of the fluid.

It is contemplated in the practice of the present invention that during the course of drilling operations it may be desirable to add oil in an amount from about 5% to about 15% by volume to the drilling fluid to improve circulation and lubrication. When oil is added, it may be desirable to employ a foam-suppressing agent. The type of oil finding use in the practice of the present invention is oil having a viscosity from about 1.5 to about 200 centipoises at 70° F. Kerosene, gas oils, and the like are satisfactory.

As a foam-suppressing agent, the fatty acid metal soaps are desirable and exemplary, of foam-suppressing agents useful in the present invention are the calcium, magnesium, aluminum and lead salts of stearic, oleic and palmitic acids. Aluminum stearate has been found to give effective results as a foam suppressor.

The present invention may be further illustrated by reference to the drawing in which the single FIGURE illustrates a drilling operation employing a preferred mode.

Referring now to the drawing, numeral 11 designates a well bore drilled from the earth's surface 12 by rotating a drill string 13 carrying on its lower end a drill bit 14 which may be a rock bit or one of the fish-tail type. The drill bit 14 is provided with the usual circulation port or ports 15 through which the drilling fluid is circulated into the well.

Lining the upper portion of the well bore 11 is a surface casing 16 which is cemented in place with cement 17. By virtue of using the present invention, a filter cake 18 is formed on the walls of the well bore 11 by deposition of mud from the drilling fluid.

Drilling fluid from the pit 19a is drawn by pump 20 through line 19 and discharged through flexible line 21 into drill stem 13 by way of swivel 22 and kelly-joint 23. The fluid circulates down the drill stem 13 as indicated by dashed arrows, out the ports 15 in drill bit 14, up the annulus 24 and by way of line 25, controlled by valve 26, back into mud pit 19a.

The drill stem 13 is rotated by means of a rotating table 27 on the floor 28 of the derrick 29. The drill stem is supported by means of block 30 and lines 31.

After initial drilling operations have commenced and proceeded with a fresh-water clay, the condition of the well bore may indicate the desirability of employing the present invention. To this end the fresh-water clay drilling fluid in the mud pit 19a and in the borehole 11 is converted by adding to it a sufficient amount of ferrochrome-lignosulfonate to provide a fluid loss less than about 20 ml. A.P.I. in the final fluid. This is suitably accomplished by discharging into mud pit 19a from tank 32 a sufficient amount of ferrochrome-lignosulfonate by opening valve 33 in line 34. The ferrochrome-lignosulfonate may be added as a solid. After the ferrochrome-lignosulfonate has been incorporated in the drilling fluid in mud pit 19a, calcium chloride is then introduced thereto from tank 35 through line 36 by opening valve 37, the ingredients of the mud pit 19a being vigorously agitated by a mud mixer or other mixing or circulating means. The calcium chloride may suitably be added as a solid in the dry condition or as a solution. Drilling operations are continued by circulating drilling fluid withdrawn by line 19 by pump 20 down the drill string 13 out through the ports 15 and up the annulus 23 and returned to the mud pit 19a by line 25.

Alternatively the ferrochrome-lignosulfonate and calcium chloride both may be added as a solid simultaneously while continuing circulation from mud pit 19a down the drill string 13 or sequentially with the dry ferrochrome-lignosulfonate first and the dry calcium chloride next. Simultaneous addition is preferred in field practice. To achieve this the ferrochrome-lignosulfonate and calcium chloride may be added through a hopper, not shown, in sequence, or in solid mixture.

It may be desirable at this point to introduce into the mud pit from tank 38 by line 39 controlled by valve 40 an amount of oil, in the range indicated before, containing a foam suppressing agent, to improve the fluid properties.

During drilling operations as described herein, it will be desirable to add sodium carboxymethyl cellulose to the drilling fluid as drilling progresses along with additional amounts of ferrochrome-lignosulfonate. To this end there is provided in tank or hopper 41 sodium carboxymethyl cellulose which may be introduced into the drilling fluid in mud pit 19a by way of line 42 controlled by line 43. During the drilling operations the ferrochrome-lignosulfonate and sodium carboxymethyl cellulose may be added separately or together as drilling proceeds to maintain the filtration rate of the drilling fluid less than about 20 ml. Addition of the ferrochrome-lignosulfonate and/or the sodium carboxymethyl cellulose maintains the ratio of the ferrochrome-lignosulfonate to the sodium salt of carboxymethyl cellulose in the range from about 1.8:1 to about 2.7:1 which provides satisfactory filtration rate and allows the drilling to proceed without difficulty.

The present invention will be further illustrated by operations wherein the composition of the present invention was used in drilling a well in a coastal Louisiana field. The drilling mud employed contained about 9 pounds of ferrochrome-lignosulfonate after breakover of the fluid to a high calcium ion mud as described with reference to the drawing; that is in the 1200 barrels of mud, 10,950 pounds of ferrochrome-lignosulfonate had been added. By breakover is meant the sharp reduction in viscosity which is obtained on adding sufficient amounts of the ferrochrome-lignosulfonate to the drilling mud.

For the first six days of drilling after breakover, addition of 2500 pounds of ferrochrome-lignosulfonate failed to halt the rise in filtration rate caused by increasing the calcium ion content from 3,000 to 4,000 p.p.m. On the eighth and ninth days the mud was treated with an additional amount of 2500 pounds of ferrochrome-lignosulfonate and 2300 pounds of sodium salt of carboxymethyl cellulose which gave a satisfactory decrease in filtration rate. On the tenth and eleventh days, however, an additional 1400 pounds of sodium carboxymethyl cellulose failed to decrease the filtration rate. At this time the ratio of ferrochrome-lignosulfonate to the sodium carboxymethyl cellulose was 1.55:1. During the next five days the filtration rate was controlled with the addition of ferrochrome-lignosulfonate alone until the ratio reached about 1.8:1 and then in spite of rather heavy treatment with ferrochrome-lignosulfonate of about 2300 pounds, the filtration rate increased. On the twenty-third day of drilling operations, mud was treated with 650 pounds of sodium carboxymethyl cellulose, which effectively lowered the filtration rate; but then treament with 3500 pounds of ferrochrome-lignosulfonate in the next nine days maintained the filtration rate about constant.

The calcium ion concentration had decreased to about 2,000 p.p.m. and was then built back up to 4,000 p.p.m. by adding more calcium chloride. A combination of both agents, that is, the ferrochrome-lignosulfonate and the sodium carboxymethyl cellulose, was used; but the filtration rate increased. After the mud had been in use sixty-two days, a heavy treatment with both agents gave a filtration rate of 4.5 ml. A.P.I. This filtration rate was maintained with moderate additions of ferrochrome-lignosulfonate and sodium carboxymethyl cellulose, during which time the ratio of ferrochrome-lignosulfonate to sodium carboxymethyl cellulose was maintained between 2.14:1 and 2.38:1 until the end of the drilling operation, which lasted seventy-nine days.

The data from these drilling operations are illustrated in the table wherein the amounts of the two agents employed, the ratio of Agent 1 to Agent 2, and the filtration rate are given relative to days after conversion of the drilling fluid to a high calcium ion mud.

Effect of Filtration Control Agents

| Days after Breakover | Agent 1, Ferrochrome Lignosulfonate, Lbs.[1] | Agent 2, Sodium Salt of Carboxymethyl Cellulose, Lbs. | Ratio: Agent 1/ Agent 2 | Filtration Ml. API | Remarks |
|---|---|---|---|---|---|
| 1 | 0 | 0 | --- | 20 | Additional ferrochrome-lignosulfonate did not reduce filtration. Calcium ion was increased from about 3,000 to 4,000 p.p.m. |
| 4 | 1,050 | 0 | ∞ | 24 | |
| 6 | 1,450 | 0 | ∞ | 46 | |
| 8 | 2,850 | 450 | 6.34 | 31 | Carboxymethyl cellulose and ferrochrome-lignosulfonate reduced filtration. |
| 9 | 5,050 | 1,850 | 2.73 | 13 | |
| 10 | | 2,950 | 1.71 | 15 | Carboxymethyl cellulose alone did not reduce filtration. |
| 11 | | 3,250 | 1.55 | 15 | |
| 14 | 5,450 | | 1.68 | 9 | Ferrochrome-lignosulfonate alone reduced filtration. |
| 15 | 5,600 | | 1.72 | 8 | |
| 16 | 5,700 | | 1.75 | 11 | |
| 17 | 6,100 | 3,350 | 1.82 | 11 | Fairly heavy treatment with mostly ferrochrome-lignosulfonate failed to maintain low filtration rate. |
| 18 | 6,450 | | 1.92 | 12 | |
| 19 | 7,150 | 3,450 | 2.07 | 14 | |
| 20 | 7,950 | | 2.30 | 15 | |
| 22 | 7,950 | | 2.30 | 17 | |
| 23 | | 4,100 | 1.94 | 10 | Carboxymethylcellulose lowered filtration rate. |
| 24 | 8,050 | | 1.96 | 12 | Substantial treatment with ferrochrome-lignosulfonate just maintained filtration rate. Calcium ion gradually decreased to about 2,000 p.p.m. during the above treatments. |
| 26 | 9,150 | | 2.23 | 13 | |
| 27 | 10,000 | 4,200 | 2.38 | 14 | |
| 28 | 10,650 | | 2.54 | 13 | |
| 29 | 11,300 | | 2.69 | 14 | |
| 30 | 11,500 | | 2.74 | 13 | |
| 31 | 12,200 | 4,700 | 2.60 | 18 | Increased calcium ion to 4,000 p.p.m. Substantial treatment with both agents failed to avoid filtration increase. |
| 32 | 13,200 | | 2.80 | 32 | |
| 35 | 13,200 | | 2.80 | 34 | |
| 36 | 13,400 | 5,400 | 2.49 | 13 | Treatment with combination of materials lowered filtration rate. |
| 43 | 13,550 | | 2.51 | 12 | Moderate treatment with both agents maintained low fluid loss. |
| 44 | 13,650 | | 2.53 | 11 | |
| 47 | 14,250 | 5,500 | 2.59 | 14 | |
| 49 | | 5,600 | 2.54 | 12 | |
| 53 | 14,350 | | 2.56 | 12 | |
| 54 | 14,500 | | 2.59 | 20 | Substantial treatment with carboxymethyl cellulose lowered filtration rate. |
| 55 | | 6,100 | 2.38 | 16 | |
| 58 | 14,600 | 6,150 | 2.38 | 16 | |
| 59 | | 6,200 | 2.36 | 16.5 | |
| 61 | 14,650 | 6,350 | 2.31 | 17 | |
| 62 | 14,750 | 6,400 | 2.31 | 12.5 | |
| 63 | 15,950 | 7,450 | 2.14 | 4.5 | Substantial treatment with both agents decreased filtration rate. |
| 64 | 16,050 | 7,500 | 2.14 | 4.5 | Moderate treatment with both agents maintained low filtration rate. |
| 65 | 16,350 | 7,600 | 2.15 | 5.0 | |
| 66 | 16,550 | 7,650 | 2.16 | 5.0 | |
| 67 | 16,650 | 7,700 | 2.16 | 5.0 | |
| 68 | 16,800 | 7,800 | 2.15 | 4.5 | |
| 69 | 17,000 | 7,850 | 2.16 | 5.0 | |
| 70 | 17,050 | | 2.16 | 5.0 | |
| 71 | 17,200 | | 2.17 | 5.0 | |
| 72 | 17,250 | 7,900 | 2.18 | 5.0 | |
| 73 | 17,400 | | 2.20 | 5.0 | |
| 74 | 18,000 | 7,950 | 2.24 | 5.0 | |
| 75 | 18,050 | | 2.24 | 5.0 | |
| 76 | 18,550 | 8,000 | 2.32 | 5.0 | |
| 77 | 18,950 | | 2.37 | 5.0 | |
| 78 | 19,000 | 8,050 | 2.36 | 5.0 | |
| 79 | 19,150 | | 2.38 | 5.0 | |

[1] Pounds in excess of that required for the breakover; 10,950 lbs. of ferrochrome-lignosulfonate; mud system volume 1200 barrels (10,950÷1200=9.1 lbs./bbl.)

It will be noted that as long as the ratio of Agent 1 to Agent 2 is within the range of about 1.8:1 to about 2.7:1, satisfactory control of filtration rate is provided below about 20 ml.

The present invention is quite advantageous and useful in that by employing the ferrochrome-lignosulfonate and sodium carboxymethyl cellulose, control of fluid loss is maintained during drilling operations employing high calcium ion muds. Not only is the invention advantageous in controlling fluid loss, but the composition of the present invention has the property of maintaining its characteristics of low filtration rates even after aging at high temperatures for long periods of time. For example, drilling fluids in accordance with the present invention maintain a low fluid loss even after being used in drilling operations wherein relatively high temperatures of approximately 250° F. are encountered. This is especially important in that wells now being drilled extend to greater depths in the earth than heretofore.

The nature and objects of the present invention having been completely described and illustrated, what we wish to claim as new and useful and secure by Letters Patent is:

1. A composition suitable for use in a well which consists of a suspension of clay, an aqueous solution containing a water-soluble salt of an alkaline earth metal in a sufficient amount to provide in said composition an amount of alkaline earth metal ion of 1800 to about 40,000 p.p.m., and sufficient amounts of ferrochrome-lignosulfonate and alkali metal salt of carboxymethyl cellulose to maintain in said composition an A.P.I. filtration rate of less than about 20 ml., said ferrochrome-lignosulfonate and alkali metal salt of carboxymethyl cellulose being in a ratio from about 1.8 to about 2.7 after breakover and said composition having a pH within the range from about 7.5 to about 10 and a density from about 8 to about 18 pounds per gallon, said composition being formed by first treating said suspension with about 1 to about 3 pounds of ferrochrome-lignosulfonate followed by addition thereto of said water-soluble salt and an additional amount of said ferrochrome-lignosulfonate to provide in said composition a concentration of about 5 to about 20 pounds of said ferrochrome-lignosulfonate.

2. A composition in accordance with claim 1 in which the alkaline earth metal is calcium.

3. A composition in accordance with claim 1 in which the alkaline earth metal is barium.

4. A composition in accordance with claim 1 in which the alkaline earth metal is magnesium.

5. A composition in accordance with claim 1 in which the alkaline earth metal is strontium.

6. A composition in accordance with claim 1 in which the alkali metal is sodium.

7. A composition suitable for use in a well which consists of a suspension of clay, an aqueous solution containing calcium chloride in a sufficient amount to provide in said composition an amount of calcium ion of 2000 to about 40,000 p.p.m., and sufficient amounts of ferrochrome-lignosulfonate and sodium carboxymethyl cellulose to maintain in said composition an A.P.I. filtration rate of less than about 20 ml., said ferrochrome-lignosulfonate and sodium carboxymethyl cellulose being in a ratio from about 1.8 to about 2.7 after breakover and said composition having a pH within the range from about 7.5 to about 10 and a density from about 8 to about 18 pounds per gallon, said composition being formed by first treating said suspension with about 1 to about 3 pounds of ferrochrome-lignosulfonate followed by addition thereto of said calcium chloride and an additional amount of said ferrochrome-lignosulfonate to provide in said composition a concentration of about 5 to about 20 pounds of said ferrochrome-lignosulfonate.

8. In a method for drilling a well wherein a drilling fluid containing a water-soluble salt of an alkaline earth metal in a sufficient amount to provide in said drilling fluid an amount of alkaline earth metal ion of 1800 to about 40,000 p.p.m. is circulated in said well through a hollow drill string to form a filter cake on the wall of said well, the improvement which comprises adding to said circulating drilling fluid a sufficient amount of ferrochrome-lignosulfonate and alkali metal salt of carboxymethyl cellulose to maintain the A.P.I. filtration rate of said circulating drilling fluid less than about 20 ml. and to maintain therein a ratio of ferrochrome-lignosulfonate to alkali metal salt of carboxymethyl cellulose within the range from about 1.8 to about 2.7 after breakover, from about 1 to about 3 pounds of said ferrochrome-lignosulfonate being added prior to breakover, said water-soluble salt and an additional amount of ferrochrome-lignosulfonate, sufficient to provide a concentration from about 5 to about 20 pounds of ferrochrome-lignosulfonate, being added after breakover.

9. A method in accordance with claim 8 in which the ferrochrome-lignosulfonate and alkali metal salt of carboxymethyl cellulose are added together.

10. A method in accordance with claim 8 in which the ferrochrome-lignosulfonate and the alkali metal salt of carboxymethyl cellulose are added separately.

11. A method in accordance with claim 8 in which the alkaline earth metal salt is calcium chloride and the alkali metal is sodium.

12. In the drilling of a well by the rotary method wherein a drilling fluid containing a water-soluble salt of calcium chloride in a sufficient amount to provide in said drilling fluid calcium ion of 2000 to about 40,000 p.p.m. is circulated in said well through a hollow drill string to form a filter cake on the wall of said well, the improvement which comprises adding to said circulating drilling fluid a sufficient amount of ferrochrome-lignosulfonate and sodium salt of carboxymethyl cellulose to maintain the A.P.I. filtration rate of said circulating drilling fluid less than about 20 ml. and to maintain a ratio of ferrochrome-lignosulfonate to sodium salt of carboxymethyl cellulose within the range from about 1.8 to about 2.7 after breakover, from about 1 to about 3 pounds of said ferrochrome-lignosulfonate being added prior to breakover, said calcium chloride and an additional amount of ferrochrome-lignosulfonate, sufficient to provide a concentration from about 5 to about 20 pounds of ferrochrome-lignosulfonate, being added after breakover.

13. A method for controlling fluid loss in a drilling fluid during drilling of a well, said drilling fluid containing a water-soluble salt of an alkaline earth metal in a sufficient amount to provide in said drilling fluid an amount of alkaline earth metal ion of 1800 to about 40,000 p.p.m. which comprises maintaining in said drilling fluid ferrochrome-lignosulfonate and an alkali metal salt of carboxymethyl cellulose in amounts sufficient to maintain the A.P.I. filtration rate of said drilling fluid less than about 20 ml. and a ratio of ferrochrome-lignosulfonate to alkali metal salt of carboxymethyl cellulose in the range between about 1.8 and about 2.7 after breakover, from about 1 to about 3 pounds of said ferrochrome-lignosulfonate being added prior to breakover, said water-soluble salt and an additional amount of ferrochrome-lignosulfonate, sufficient to provide a concentration from about 5 to about 20 pounds of ferrochrome-lignosulfonate, being added after breakover.

14. A method in accordance with claim 13 in which said ratio is maintained by adding ferrochrome-lignosulfonate to said drilling fluid.

15. A method in accordance with claim 13 in which said ratio is maintained by adding alkali metal salt of carboxymethyl cellulose to said drilling fluid.

16. A method in accordance with claim 13 in which said ratio is maintained by adding both ferrochrome-lignosulfonate and alkali metal salt of carboxymethyl cellulose to said drilling fluid.

17. A method for controlling fluid loss in a drilling fluid during drilling of a well, said drilling fluid containing calcium chloride in a sufficient amount to provide in said drilling fluid an amount of calcium ion of 2000 to about 40,000 p.p.m. which comprises maintaining in said drilling fluid ferrochrome-lignosulfonate and sodium salt of carboxymethyl cellulose in an amount sufficient to maintain the A.P.I. filtration rate of said drilling fluid less than about 20 ml. and a ratio of ferrochrome-lignosulfonate to sodium salt of carboxymethyl cellulose in the range between about 1.8 and about 2.7 after breakover, from about 1 to about 3 pounds of said ferrochrome-lignosulfonate being added prior to breakover, said calcium chloride and an additional amount of ferrochrome-lignosulfonate, sufficient to provide a concentration from about 5 to about 20 pounds of ferrochrome-lignosulfonate, being added after breakover.

References Cited in the file of this patent

UNITED STATES PATENTS

| | | |
|---|---|---|
| 2,371,955 | Dawson | Mar. 20, 1945 |
| 2,425,768 | Wagner | Aug. 19, 1947 |
| 2,536,113 | Wagner | Jan. 2, 1951 |
| 2,802,783 | Weiss et al. | Aug. 13, 1957 |
| 2,856,154 | Weiss et al. | Oct. 14, 1958 |
| 2,856,356 | Weiss et al. | Oct. 14, 1958 |
| 2,868,726 | Brukner et al. | Jan. 13, 1959 |
| 2,871,189 | Brukner | Jan. 27, 1959 |
| 2,935,473 | King et al. | May 3, 1960 |
| 2,935,504 | King et al. | May 3, 1960 |

OTHER REFERENCES

Rogers: Composition and Properties of Oil Well Drilling Fluids, Revised Ed., pub. 1953, by Gulf Pub. Co. of Houston, Texas, pp. 438 and 442 to 445.